United States Patent
Høyland

(10) Patent No.: US 12,126,238 B2
(45) Date of Patent: Oct. 22, 2024

(54) ELECTRIC MACHINE ROTOR SLEEVE

(71) Applicant: ROLLS-ROYCE ELECTRICAL NORWAY AS, Trøndelag (NO)

(72) Inventor: Jørg Høyland, Trondheim (NO)

(73) Assignee: ROLLS-ROYCE ELECTRICAL NORWAY AS, Trondheim (NO)

( * ) Notice: Subject to any disclaimer, the term of this patent is extended or adjusted under 35 U.S.C. 154(b) by 292 days.

(21) Appl. No.: 17/670,903

(22) Filed: Feb. 14, 2022

(65) Prior Publication Data

US 2022/0271601 A1  Aug. 25, 2022

(30) Foreign Application Priority Data

Feb. 24, 2021  (GB) ..................................... 2102583

(51) Int. Cl.
*H02K 5/02* (2006.01)
*B32B 5/12* (2006.01)

(52) U.S. Cl.
CPC .............. *H02K 5/02* (2013.01); *B32B 5/12* (2013.01); *B32B 2260/023* (2013.01); *B32B 2260/046* (2013.01); *B32B 2262/106* (2013.01); *B32B 2307/52* (2013.01); *B32B 2307/546* (2013.01); *B32B 2307/732* (2013.01); *B32B 2457/00* (2013.01); *H02K 2213/03* (2013.01)

(58) Field of Classification Search
CPC ............ H02K 5/02; H02K 5/04; H02K 5/128; H02K 1/27; H02K 1/2706; H02K 1/278; H02K 1/2791; B32B 5/08; B32B 5/10; B32B 5/12; B32B 5/14; B32B 5/145; B32B 5/22; B32B 5/24; B32B 5/26; B32B 2260/023; B32B 2260/046; B32B 2262/106; B32B 2307/51; B32B 2307/52; B32B 2307/546; B32B 2457/00
USPC ................................ 428/298.1, 299.1, 300.7
See application file for complete search history.

(56) References Cited

U.S. PATENT DOCUMENTS

| | | | |
|---|---|---|---|
| 2,250,642 A | * | 6/1992 | Blakeley ................ H02K 9/197 310/54 |
| 5,122,704 A | | 6/1992 | Blakeley et al. |

(Continued)

FOREIGN PATENT DOCUMENTS

| | | |
|---|---|---|
| CN | 204906030 U | 12/2015 |
| EP | 1369976 A1 | 12/2003 |

(Continued)

OTHER PUBLICATIONS

U.S. Appl. No. 17/670,880, filed Feb. 14, 2022 in the name of Jørg Høyland.

(Continued)

*Primary Examiner* — Naishadh N Desai
*Assistant Examiner* — Ahmed F Seck
(74) *Attorney, Agent, or Firm* — Oliff PLC

(57) ABSTRACT

An electric machine comprising a stator (50), a rotor (29) radially inward of the stator and comprising a plurality of surface permanent magnets (44) and a rotor sleeve (46) surrounding the rotor. The rotor sleeve comprises a plurality of layers of fibre reinforced matrix material (56, 60). The rotor sleeve defines a rotor sleeve radius to radial thickness ratio (r:t) between 20 and 40, and the electric machine has a maximum rotor rotational speed greater than 15000 RPM.

17 Claims, 11 Drawing Sheets

(56) References Cited

U.S. PATENT DOCUMENTS

| | | | | |
|---|---|---|---|---|
| 5,168,186 | A | * | 12/1992 | Yashiro .................. H02K 5/128 310/156.28 |
| 5,485,045 | A | | 1/1996 | Canders et al. |
| 2003/0146670 | A1 | * | 8/2003 | Van Dine ................ H02K 1/278 310/85 |
| 2004/0021396 | A1 | | 2/2004 | Ehrhart et al. |
| 2012/0313461 | A1 | | 12/2012 | Takeuchi |
| 2014/0099516 | A1 | * | 4/2014 | Hunt ........................ B32B 15/01 428/615 |
| 2014/0349043 | A1 | * | 11/2014 | Greer .................. B32B 2457/00 428/34.5 |
| 2015/0188369 | A1 | | 7/2015 | Arimatsu |
| 2015/0330231 | A1 | | 11/2015 | McGuire et al. |
| 2015/0364960 | A1 | * | 12/2015 | Arimatsu ........... H02K 15/0006 310/156.28 |
| 2016/0089617 | A1 | * | 3/2016 | Wardle ................ B01D 11/048 210/634 |
| 2017/0133894 | A1 | * | 5/2017 | Li ........................... H02K 1/165 |
| 2017/0373548 | A1 | | 12/2017 | Arimatsu |
| 2019/0001650 | A1 | * | 1/2019 | Sohn ................ B32B 2260/046 |
| 2019/0137012 | A1 | * | 5/2019 | Kuwajima ........ B32B 2262/106 |
| 2019/0181707 | A1 | * | 6/2019 | Takano .................. H02K 1/278 |
| 2019/0199151 | A1 | * | 6/2019 | Loder ...................... H02K 1/02 |
| 2022/0190660 | A1 | * | 6/2022 | Flower .................... H02K 1/04 |
| 2023/0356480 | A1 | * | 11/2023 | Mizumoto ................ B32B 5/12 |

FOREIGN PATENT DOCUMENTS

| | | | | |
|---|---|---|---|---|
| GB | 2250642 | A | | 6/1992 |
| GB | 2549449 | A | * | 10/2017 ............... H02K 1/04 |
| JP | H09-019093 | A | | 1/1997 |
| JP | 2017-163752 | A | | 9/2017 |
| JP | 2018-082564 | A | | 5/2018 |
| WO | 2013/160739 | A2 | | 10/2013 |
| WO | 2020188006 | A1 | | 9/2020 |

OTHER PUBLICATIONS

U.S. Appl. No. 17/670,857, filed Feb. 14, 2022 in the name of Jørg Høyland et al.
Jun. 21, 2021 Search Report issued in British Patent Application No. 2102581.2.
Jun. 21, 2021 Search Report issued in British Patent Application No. 2102582.0.
Jun. 23, 2021 Search Report issued in British Patent Application No. 2102583.8.
Aug. 2, 2023 Office Action Issued In U.S. Appl. No. 17/670,880.
Aug. 1, 2022 Search Report issued in European Patent Application No. 22157656.4.
Jun. 23, 2023 Office Action received in U.S. Appl. No. 17/670,857.
Aug. 1, 2022 European Search Report issued in European Patent Application No. 22157654.9.
Aug. 1, 2022 European Search Report Issued in European Patent No. 22157653.1.
Nov. 3, 2023 Notice of Allowance issued in United States U.S. Appl. No. 17/670,857.
Dec. 7, 2023 U.S. Notice of Allowance issued in U.S. Appl. No. 17/670,880.
Sep. 7, 2023 Office Action issued in U.S. Appl. No. 17/670,857.

* cited by examiner

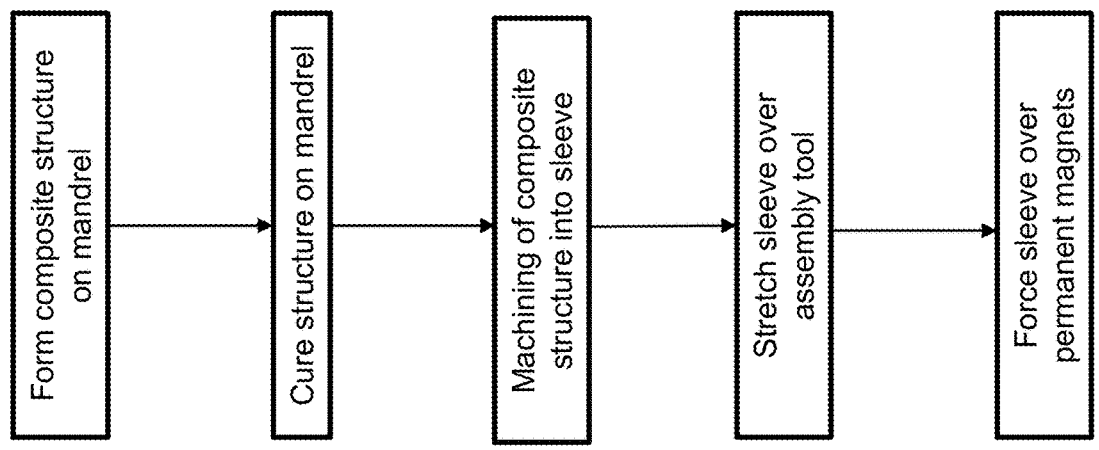

ELECTRIC MACHINE ROTOR SLEEVE

The present disclosure concerns a rotor sleeve for an electric machine, a rotor comprising the rotor sleeve, an electric machine comprising the rotor. The present a hybrid electric propulsion system and aircraft having the electric machine.

Permanent magnet machines are known, in which a rotor comprising one or more permanent magnet is provided to rotate relative to a stator comprising electric windings.

Typically, the rotor comprises a radially inner rotor core/shaft to which the magnets are bonded. Securely affixing the permanent magnets to the inner core is difficult in view of the incompatible materials typically used, and the high centrifugal forces which act to drive the magnets radially outwards. Such centrifugal forces may be particularly high in the case of high-power electric machines in view of the large rotor diameters and higher rotational speeds encountered by such machines.

This problem is particularly acute for electric machines used on aircraft. Such machines must have a high power density, and so must rotate at high speeds. Additionally, the release of one or more permanent magnets may represent a serious safety issue due to the high velocity debris, in addition to the safety issues inherent in failure of the machine itself.

Conventionally, such machines comprise a rotor sleeve (also known as a rotor "banding") which surrounds the rotor to contain the permanent magnets. This banding must be located in the air-gap between the rotor and stator. Consequently, where such a banding is installed, the distance between the rotor and stator is increased, leading to reduced machine power density. Consequently, it is desirable to reduce the thickness of this rotor banding. Further problems with prior art banding systems may also be encountered, such as cost, difficulty of installation, weight and strength.

According to a first aspect there is provided an electric machine comprising: a stator;
 a rotor radially inward of the stator and comprising a plurality of surface permanent magnets;
 a rotor sleeve surrounding the rotor, the rotor sleeve comprising:
 a plurality of layers of fibre reinforced matrix material; wherein the rotor sleeve defines a rotor sleeve radius to radial thickness ratio between 20 and 40; and wherein the electric machine has a maximum rotor rotational speed greater than 15000 RPM.

It has been found that, by providing a rotor sleeve having a high rotor sleeve radius to radial thickness ratio, a relatively small air gap between the rotor and stator can be achieved. This small air gap in turn results in high power densities in high speed electric machines, which in turn results in reduced weight. This can be achieved through the use of a rotor sleeve comprising a plurality of layers of fibre reinforced matrix material.

The plurality of layers of fibre reinforced matrix material may comprise a plurality of layers of carbon fibre reinforced polymer, each layer comprising fibres oriented substantially 90° to the rotational axis.

The rotor sleeve may comprise at least one layer of fibres having a lower modulus of elasticity relative to the modulus of elasticity of the carbon fibre layers, provided between layers of carbon fibre reinforced polymer.

The lower modulus of elasticity fibres may be oriented between 50° and 75° relative to the rotational axis.

The carbon fibres of each carbon fibre reinforced polymer layer may be oriented between 89° and 90° to the rotational axis.

The carbon fibres of one or more carbon fibre reinforced polymer layer may be oriented between 89.2° and 89.9° to the rotational axis. In one embodiment, the carbon fibres of one or more carbon fibre reinforced polymer layer may be oriented approximately 89.5° to the rotational axis.

One or more layer of carbon fibre reinforced polymer may define a radial thickness of no more than 2 mm, and may define a radial thickness of between 1 and 2 mm. It has been found that thicknesses greater than 2 mm may result in a loss of transverse strength.

The sleeve may comprise between 5 and 20% low modulus of elasticity fibre reinforced composite. This amount of low modulus of elasticity fibre allows the great majority of the composite fibres to comprise carbon fibre, resulting in high strength, while providing sufficient axial strength to prevent failure.

The low modulus of elasticity fibres may be oriented approximately 60° relative to the rotational axis.

The sleeve may comprise first and second low modulus of elasticity fibre layers between each pair of carbon fibre reinforced plastic layer, wherein fibres of the first layer of low modulus of elasticity fibres are oriented 50° to 75° relative to the rotational axis in a clockwise direction, while fibres of the second layer of low modulus of elasticity fibres are oriented 50° to 75° relative to the rotational axis in an anti-clockwise direction.

Fibres of the first layer of low modulus of elasticity fibres may be oriented approximately 60° relative to the rotational axis in a clockwise direction, while fibres of the second layer of low modulus of elasticity fibres may be oriented approximately 60° relative to the rotational axis in an anti-clockwise direction.

The low modulus of elasticity fibres may comprise any of glass fibre, aramid, ultra-high molecular weight polyethylene (such as Dyneema™) and poly(p-phenylene-2,6-benzobisoxazole) (PBO).

The low modulus of elasticity fibres may be provided within a matrix material such as epoxy, cyanate ester or phenolic resin.

The low modulus of elasticity fibres may comprise any of glass fibre, aramid, PBO, E-glass, S-glass, nylon, or Dyneema, or a mixture of one of more of these materials.

The rotor sleeve may comprise an inner layer of fibre reinforced matrix material provided radially inwardly of an outer layer of fibre reinforced matrix material, the inner layer comprising a first fibre material having a modulus of elasticity lower than the fibre material of the outer layer.

The inner and/or outer layer of fibre reinforced matrix materials may comprise pre-stressed fibres.

The fibres of the outer layer may be pre-stressed to a stress of greater than 1000 MPa, and may be stressed to a stress of between 500 and 1500 MPA.

The layers of fibre reinforced matrix material may comprise a matrix material such as epoxy, cyanate ester or phenolic resin.

The inner layer of fibre reinforced matrix materials may comprise any of glass fibre, aramid, PBO, E-glass, S-glass, nylon, or Dyneema, or a mixture of one of more of these materials.

The inner layer may comprise alternating ply angles of approximately +45° and −45° relative to a rotational axis of the electric machine rotor when installed.

The inner layer may have a radial thickness of between 0.1 and 1 mm, and may have a radial thickness of approximately 0.5 mm.

The outer layer may comprise carbon or ceramic fibre.

The outer layer may comprise ply angles of approximately 90° relative to a rotational axis of the electric machine rotor when installed.

The electric machine may be configured to operate as one or both of a generator and a motor.

According to a second aspect there is provided an aircraft propulsion system comprising an electric machine according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which:

FIG. 10 is a flow diagram illustrating a method of installing the sleeve on a rotor of an electric machine.

Figure 1:
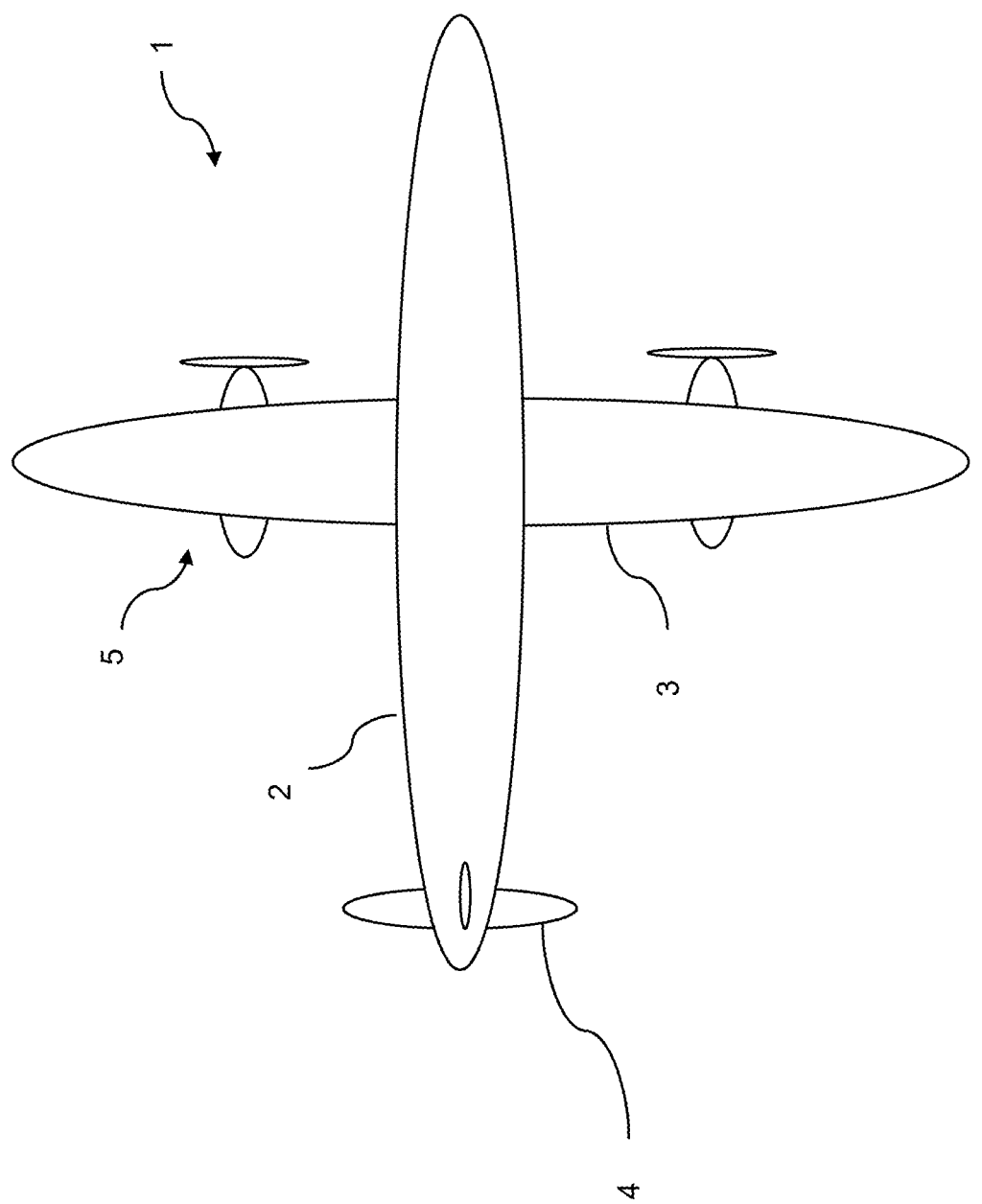
FIG. 1 is a plan view of a first aircraft comprising a parallel hybrid propulsion system.

With reference to FIG. 1, an aircraft 1 is shown. The aircraft is of conventional configuration, having a fuselage 2, wings 3, tail 4 and a pair of propulsion systems 5. One of the propulsion systems 5 is shown in figure detail in FIG. 2.

Figure 2:
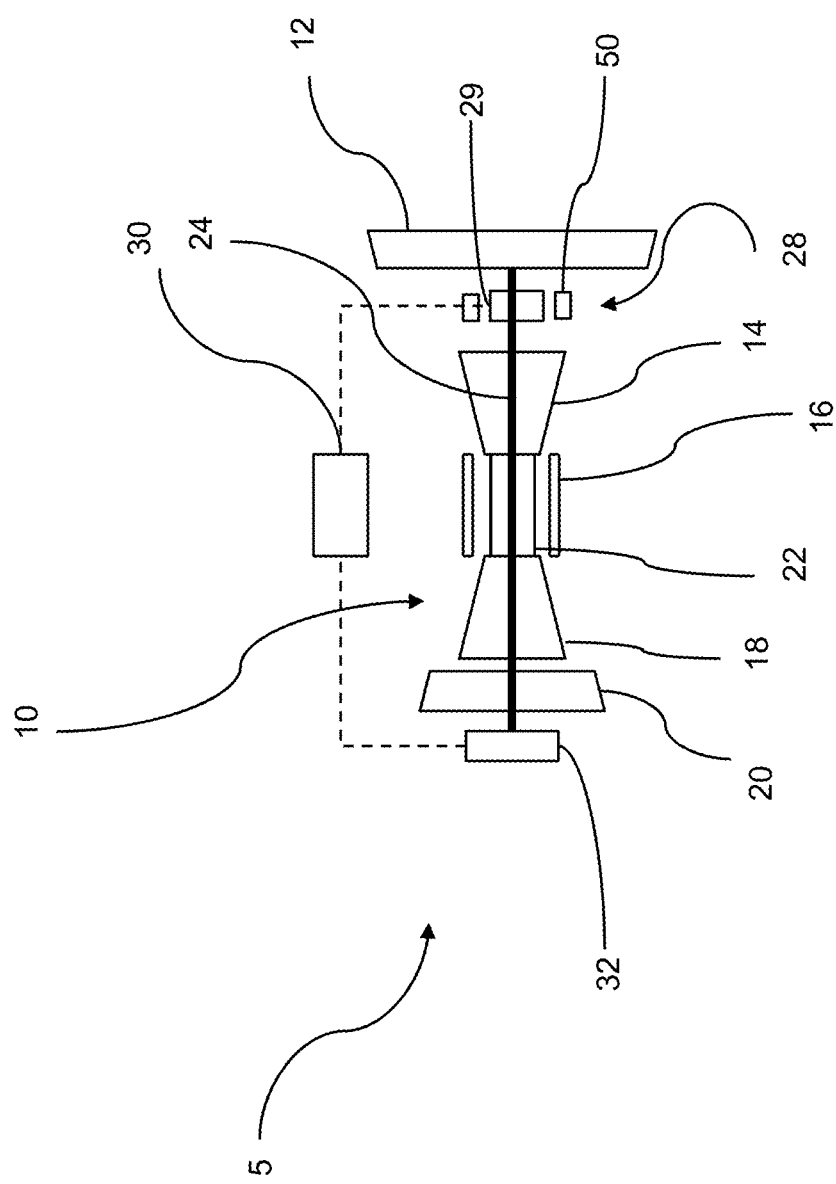
FIG. 2 is a schematic diagram of a parallel hybrid propulsion system for the aircraft of FIG. 1.

FIG. 2 shows the propulsion system 5 schematically. The propulsion system 5 includes an internal combustion engine in the form of a gas turbine engine 10. The gas turbine engine 10 comprises, in axial flow series, a propulsor in the form of a fan/propeller 12, a compressor 14, combustion equipment 16 and high and low-pressure turbines 18, 20.

The gas turbine engine 10 works in the conventional manner so that air is accelerated by the fan 12 to produce two air flows: a first core air flow into the compressor 14 and a second air flow which bypasses the compressor 14 to provide propulsive thrust. The core air flows through the compressor 14 where it is compressed, before delivering that air to the combustion equipment 16, where it is mixed with fuel and the mixture combusted. The resultant hot combustion products then expand through, and thereby drive the turbines 18, 20 before being exhausted through a nozzle to provide additional propulsive thrust. The high 18 and low-pressure turbines 18, 20 drive respectively the compressor 14 and fan 12, each by suitable interconnecting shaft 22, 24.

Other gas turbine engines to which the present disclosure may be applied may have alternative configurations. By way of example such engines may have an alternative number of interconnecting shafts (e.g. three) and/or an alternative number of compressors and/or turbines. Further, the engine may comprise a gearbox provided in the drive train from a turbine to a compressor and/or fan.

The propulsion system 5 further comprises one or more electrical machines. In particular, the system 5 comprises an electric motor 28. The motor 28 is of a conventional type in the form of a surface mount permanent magnet electric machine, and is configured to drive a propulsor such as the fan 12. In the present embodiment, the motor 28 is coupled to the fan 12 via the low-pressure shaft 24. In this embodiment, the electric motor 28 is of a "core shaft mounted" type, in which a rotor 29 of the motor 28 is mounted directly to a surface of the low-pressure shaft 24, and is surrounded by a stator 50, provided radially outwardly of the rotor 29. The stator comprises electrical windings (not shown), which can be energised to produce a rotating magnetic field. This rotating magnetic field interacts with a magnetic field of the rotor 29, to cause rotation when acting as a motor. Consequently, the fan 12 may be powered by either or both of the gas turbine engine 10 via the low-pressure turbine 20, and the motor 28.

The electric motor 28 is coupled to an energy storage device 30 in the form of one or more of a chemical battery, fuel cell, and capacitor, which provides the electric motor 28 with electrical power during operation. In some cases, multiple energy storage systems, which may be of different types (chemical battery, fuel cell etc) may be provided for each propulsion system 5. In other cases, a common energy storage device 30 may be provided for multiple propulsion systems.

The propulsion system optionally comprises one or more further electric machines such as a generator 32, which is coupled to one or both of the motor 28 and the energy storage device 30, such that additional electrical energy can be provided in operation. The generator 32 is typically driven by the low-pressure shaft 24 of the gas turbine engine 10. The generator 32 may be coupled to the shaft 24 via a gearbox and/or clutch to allow for selectively connecting and disconnecting the generator 32 from the shaft 24. In some cases, the motor 28 may act as a generator.

Figure 3:
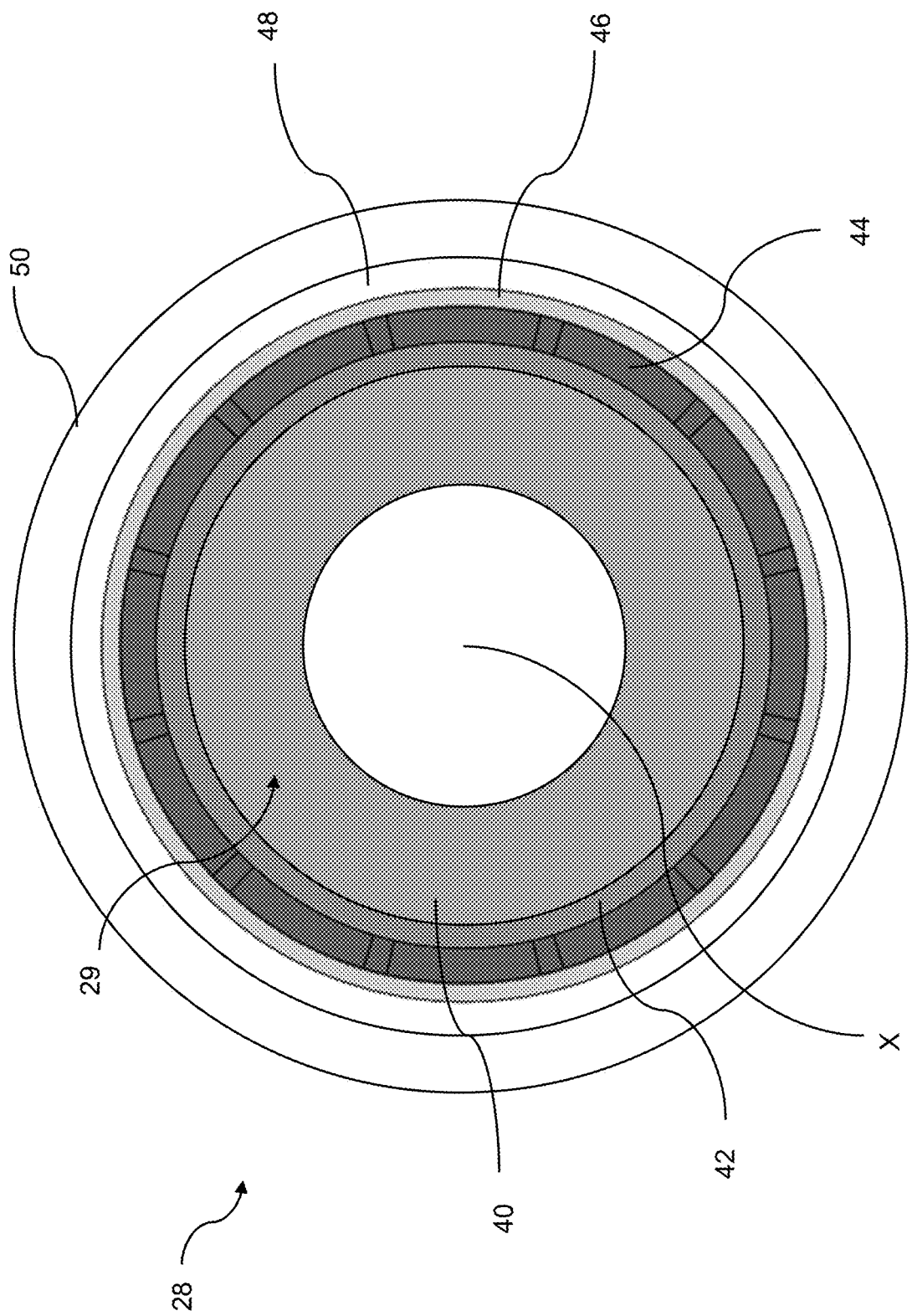
FIG. 3 is a schematic cross-sectional view of an electric machine suitable for the propulsion system of FIG. 2.

Details of the electric motor 28 are shown in FIG. 3. As will be appreciated, the generator 32 is broadly similar to the motor 28.

The motor 28 comprises a rotor 29 and a stator 50.

The rotor 29 comprises a shaft 40 which defines a rotational axis X. The shaft 40 is typically constructed from a structural material such as steel, aluminium or titanium, and is configured to be rotated by the motor 28 in use, and is coupled to the propulsor 12.

Radially outward of the shaft is a plurality of steel laminations 42. The steel laminations are typically thin, to minimise eddy currents, to thereby reduce losses and heat generation. Alternatively, the rotor may not comprise laminated steel, and the magnets could instead be attached directly to the shaft 40. In those cases, a steel alloy such as 9310 could be used for the shaft 40.

Radially outward of the laminations 42 is a plurality of permanent magnets 44. The permanent magnets 44 are provided on a circumferential outer surface of the laminations 42 (or shaft 40), and so the rotor can be said to be of the "surface permanent magnet" type. The permanent magnets 44 are typically adhered to the steel laminations by an adhesive.

However, the adhesive may not be sufficiently strong to resist centrifugal loads in use. In order to maintain the rotor in position in use, in opposition to centrifugal loads on the rotor, the rotor further comprises a rotor sleeve 46 which is provided radially outward of and at least partly surrounding the permanent magnets 44, and is configured to rotate with the rotor in use. The rotor sleeve 46 is described in further detail below, and is shown in more detail in FIGS. 4 and 5.

Radially outward of the sleeve 46 is an air gap 48, which allows for relative rotation between the rotor and stator 50. The stator 50 is provided radially outward of the air-gap 48 and comprises a plurality of stator coils (not shown), which, when energised, drive the rotor by interaction between the magnetic fields of the stator coils and the permanent magnets 44.

Figure 4:
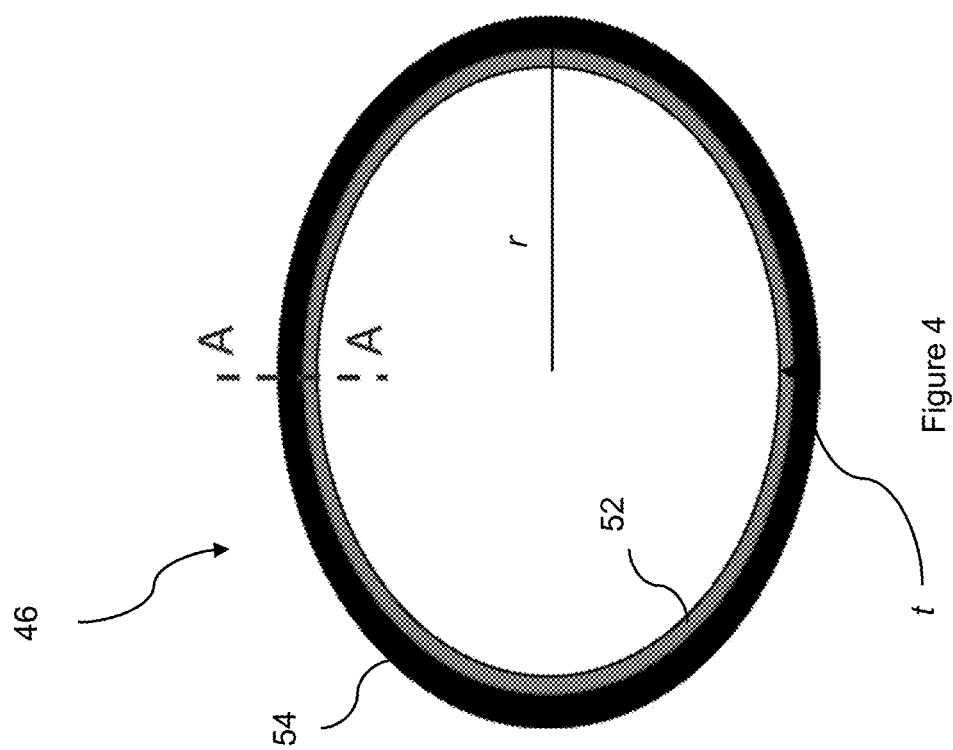
FIG. 4 is a cross-sectional view of a rotor sleeve of the electric machine of FIG. 3.

Referring now to FIG. 4, the rotor sleeve 46 is shown in more detail. The sleeve comprises an inner layer 52 and outer layer 54 which comprise different materials. The rotor 46 has a radius r, measured from a centre of the rotational axis (i.e. the centre of the rotor shaft 40) to an outer radius of the sleeve 46. The sleeve 46 also has a radial thickness t measured as a radial thickness between a radially inner surface of the sleeve 46 where the sleeve contacts the permanent magnets, to a radially outer surface. In the present embodiment, the radius r is approximately 283 mm, and the thickness t is 8.4 mm. consequently, a radius to thickness ratio r/t is approximately 33. Such a relatively high radius to thickness ratio implies a relatively thin sleeve compared to the radius of the rotor. Since the effective air gap is the distance between the outer surface of the permanent magnets and the inner surface of the stator (which includes the thickness of the sleeve), a thin sleeve implies a small effective air gap. Consequently, a relatively small air gap is provided, which in turn allows for a torque dense electrical machine.

The power density of the machine (i.e. the maximum power of the machine divided by the mass of the machine) is then dependent on the torque density multiplied by the maximum rotational speed of the machine (in, say, RPM). A higher speed machine will have a higher power density for a given torque density, but will also apply greater loads on the rotating components.

The thin rotor sleeve 46 allows for a high torque density, but implies high hoop stress at high rotational speeds. This is because hoop stress can be related to sleeve radius and thickness by the following equation:

$$\sigma_\theta = \frac{Pr}{t}$$

Where:
$\sigma_\theta$=hoop stress
P=internal pressure applied radially to the sleeve
r=radius
t=thickness The pressure is in turn related to the centrifugal force F divided by the internal surface area of the sleeve. The centrifugal force is related to the mass of the rotor, the distribution of mass of the rotor, as well as the angular velocity (i.e. rotational speed) of the rotor.

The inventors have tested an electrical machine configured to rotate at at least 15,000 RPM, and in particular, to rotate at a maximum speed of 18,000 RPM. The maximum speed at which the rotor can rotate will be appreciated to depend on various conditions, among which are the mechanical limitations of bearings and other moving parts, as well as thermal limitations, such as heat generated by the interaction of the magnetic fields of the rotor and stator, electrical heating of cables within the stator, and frictional heating. However, a maximum rotational speed can be defined for a given electrical machine as a maximum speed, above which damage to the electrical machine can be expected to occur. This can be determined through testing or computer modelling. The inventors have found that hoop stresses in the rotor sleeve frequently define the limiting rotational speed of the rotor, and so limit power density in a well-designed machine.

The inventors have found that a particularly high overall power density is provided where the rotor radius to sleeve thickness ratio is between 25 and 40, and preferably between 30 and 35, and in one embodiment, approximately 33, where the sleeve is manufactured using wound fibres. Wound fibres provide high strength, and so allow for high hoop loads at high RPM, while providing for a thin sleeve. A thinner sleeve may result in a relatively low RPM limit (below approximately 15,000 RPM), and so results in lower overall power density, in spite of the high torque density provided by the small air gap. Consequently, the inventors have found a combination of parameters that enables high power density in a permanent magnet electrical machine.

The inventors have tested an electrical machine which is configured to rotate at a maximum rotational speed of 18,000 RPM. At this speed, the electrical machine, when operated as a motor, consumes approximately 2.5 MW of electrical power. It will be understood that the electrical machine can also be operated as a generator, in which case it will generate approximately 2.5 MW of electrical power.

At this rotational speed, a hoop stress of approximately 1100 to 1600 MPa is generated in the sleeve 46. The sleeve 46 can tolerate hoop stresses beyond this value.

Various additional features of the sleeve are described below, which assist in achieving the high hoop stress which can be tolerated by the sleeve.

The sleeve comprises inner and outer layers, as shown in FIG. 4. The inner layer 52 comprises a composite material comprising filaments 56 of a first material having a relatively low modulus of elasticity. That is to say, the first material is relatively elastic, and can deform to a relatively large degree when a tensile force is applied. The material of the first filaments must also be relatively flexible, to allow it to be wound into shape. Examples of suitable materials include glass fibres, aramid, Polybenzoxazole (PBO), E-glass, S-glass, nylon, or Dynema, or a mixture of one of more of these materials. In one example, in the case of glass fibres, the fibres have a stiffness modulus of approximately 20 Giga-Pascals GPa.

The fibres 56 of the inner layer 52 are embedded within a matrix material such a resin such as phenolic, epoxy, cyanate ester resin or PEEK 58. Together, the fibres 56 and resin 58 form a composite material.

Similarly, the outer layer 54 comprises a composite material comprising filaments 60 in a matrix material 62. However, the filaments 60 are typically of a second material having a relatively high modulus of elasticity, i.e. higher than the modulus of elasticity than the first material. In this embodiment, the filaments 60 comprise carbon fibre, though other fibre materials may be suitable. The matrix material 62 may be the same as the matrix material 58 of the inner layer 52, or may be a different material to ensure compatibility with the different fibres materials. In one example, the filaments comprise a stiffness modulus of approximately 180 (GPa). Higher stiffness modulus fibres could be used, such as fibres having 300 GPA or even higher stiffness. In one example, the fibre used has a stiffness of 324 GPa. Consequently, the filaments of the outer layer have a modulus of elasticity approximately 20 times higher than the filaments of the inner layer. In other embodiments, the filaments of the inner layer may a stiffness closer to that of the outer layer. The ratio of outer layer fibre stiffness to inner fibre layer stiffness may be in the range of 2:1 to 40:1.

Figure 5B:
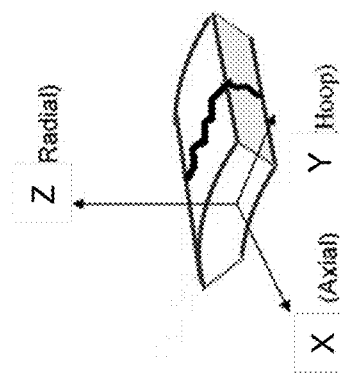
FIGS. 5a and 5b are diagrams illustrating the ply directions of the rotor sleeve of FIG. 4.
Figure 5A:
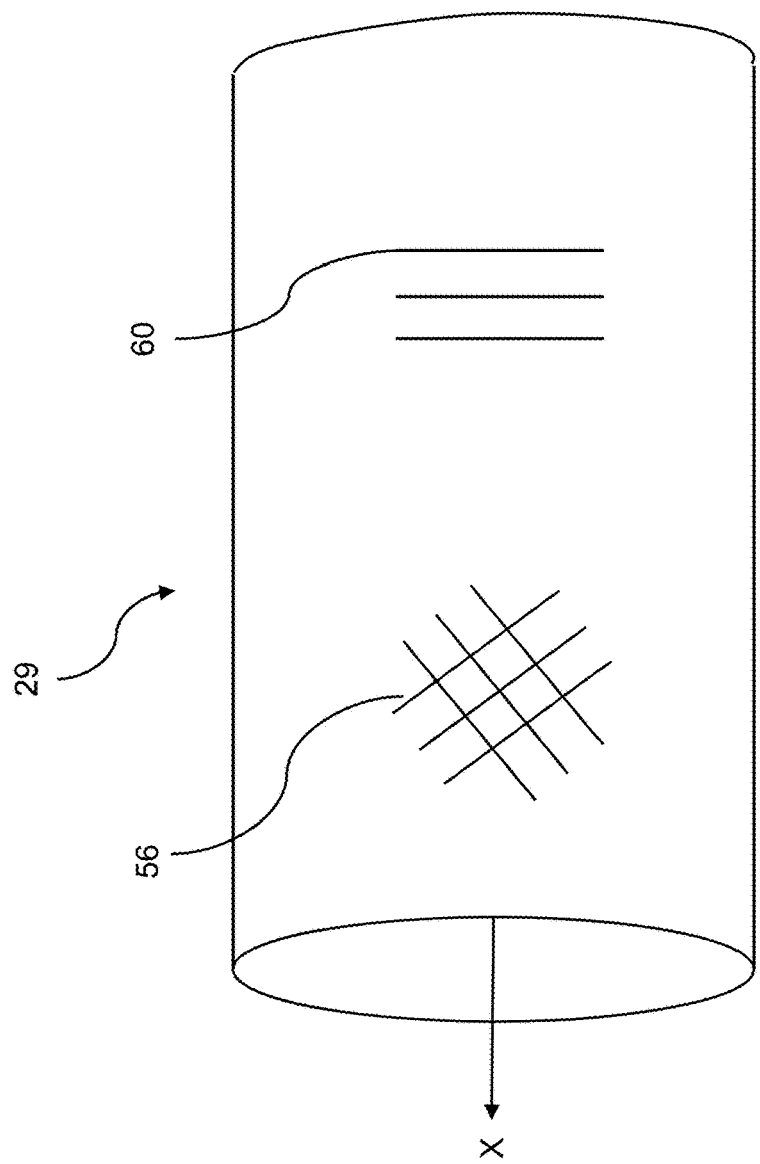

Though the drawings are not shown to scale, definitions of orientations used in this document are illustrated in FIGS. 5a and 5b. The sleeve 46 is of generally cylindrical shape, and defines a longitudinal, rotational axis X along its length. This axis X corresponds to the rotational axis of the sleeve when installed on the motor 28. Directions parallel to the rotational axis are described as the axial direction.

A hoop direction Y is defined normal to the X direction, extending circumferentially around the cylinder. Similarly, a radial direction Z is defined normal to both the axial and hoop directions X, Y, which extends radially outward from the rotational axis.

A thickness $T_1$ of the inner layer in the radial direction is approximately 0.5 mm, and more generally is between 0.1 and 1 mm. On the other hand, a thickness $T_2$ of the outer layer is generally between 3 and 15 mm, depending on the required strength and stiffness of the sleeve 46. Although the inner layer adds thickness to the sleeve, the overall thickness of the sleeve is reduced for a given strength.

Typically, in order to optimise the properties of the inner and outer layers 52, 54 the filaments 56, 60 are arranged in plies, such that they are wound in predetermined directions. The plies of the inner layer 52 are provided as a plurality of sublayers, with the plies of each sub-layer being angled approximately 90° relative to a neighbouring layer. This ensures interlocking of the sub-layers, and enhances the multi-directional strength of the inner layer 52.

Figure 6:
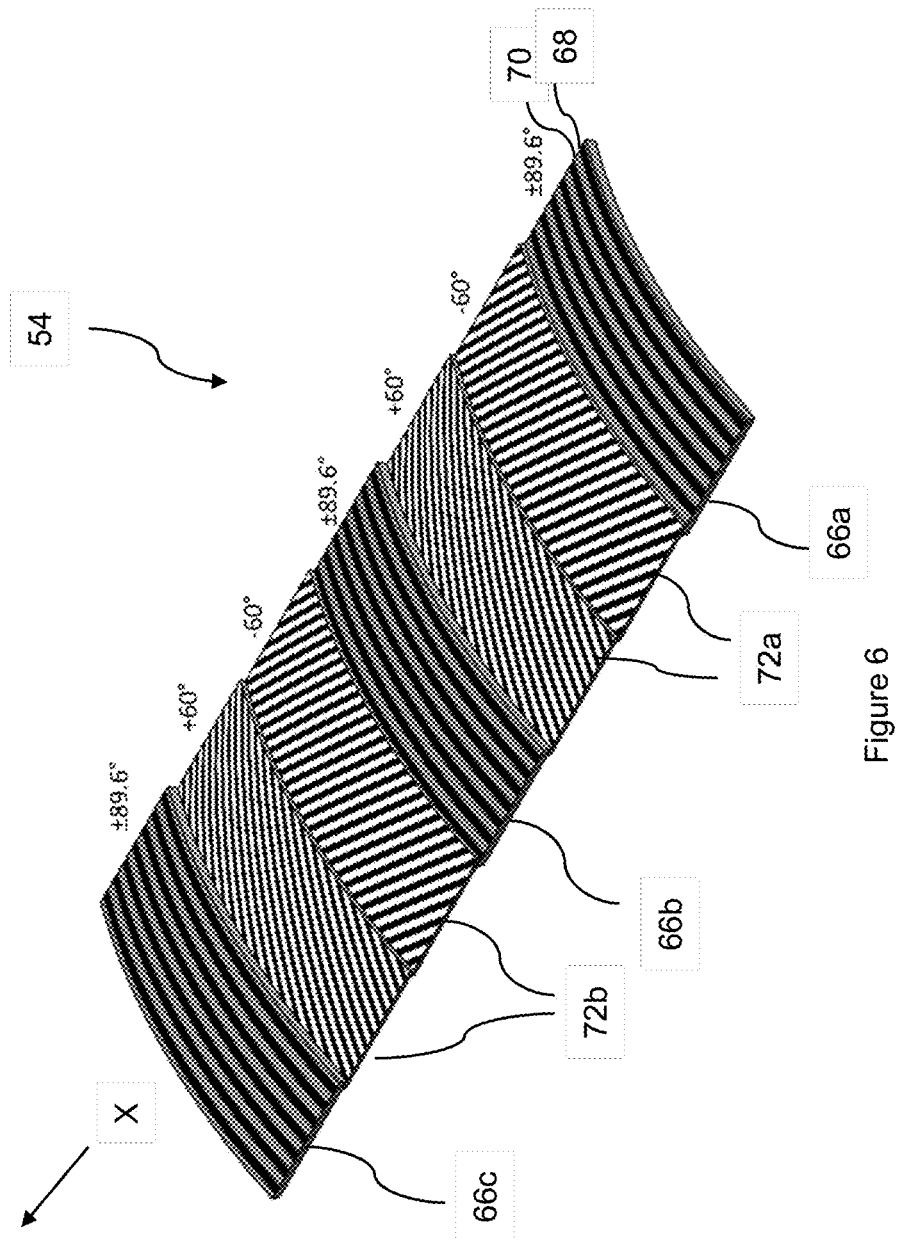
FIG. 6 is a cross-sectional perspective view of the rotor sleeve of FIG. 4, showing various layers.

Similarly, the filaments of the outer layer 54 are also arranged in plies, as shown in FIG. 6.

The outer layer 54 comprises a first layer 66a. The first layer 66a comprises a composite material comprising carbon fibre filaments 68 embedded within a polymer matrix 70 such as such as a resin such as phenolic, epoxy, cyanate ester resin or PEEK.

Each of the fibres 68 within the first layer 66a is oriented substantially in the hoop direction Y, i.e. approximately 90° to the axial direction. It has been found however that additional advantages are provided where the fibre 68 is wound at an angle somewhat less than 90°, and in this embodiment, the fibre 68 is wound at 89.6°. it has been found that additional benefits can be obtained where the carbon fibre 68 is wound at angles between 89° and 90°, and preferably between 89.2 and 89.9°, for reasons that will be explained in further detail below. The first layer 66a typically has a thickness less than 2 mm, and preferably between 1 and 2 mm, for reasons that will be explained below.

A second layer 72a of the outer layer 54 may be wound in multiple passes in opposite directions, wherein the orientation of the fibres is reversed when the winding direction is reversed. For example, in a first pass, the fibres may be wound in a first axial direction X, in which the fibres are oriented approximately 60° (and more generally, between 50° and 75°) clockwise relative to the axial direction X. In a second pass, the fibres may be wound in a second axial direction, opposite the first axial direction, wherein fibres are oriented approximately 60° (and more generally, between 50° and 75°) anti-clockwise relative to the axial direction X, to produce a hatched pattern. Multiple further passes may be necessary in order to obtain sufficient coverage over the first layer 66a, such that substantially no gaps in the second layer 72a are present. Optionally, additional further layers may be necessary in order to obtain the necessary radial thickness of the second layer 72a.

The second layer 72a is then followed by a subsequent first layer 66b, and the pattern continues. As many layers as are necessary are then built up, to provide the necessary thickness of the layer 54 to achieve the desired strength.

In total, the fibres of the outer layer 54 comprise between 80 and 95% carbon fibre filaments by volume (vol %), with the lower elastic modulus fibres providing the remaining 5 vol % to 20 vol %. Consequently, the strength providing by the carbon fibres is maintained, since these make up the majority of the fibres in the composite. In one example tested by the inventors, the sleeve fibre content consisted of 15 vol % glass fibres, and 85 vol % carbon fibres.

In one example, the low elastic modulus filaments comprise an elastic modulus of approximately 93 Giga-Pascals (GPa). The resin in which the filaments are embedded has an elastic modulus of approximately 8 GPa. Where the layer comprises approximately 50% glass fibres, this gives an overall modulus of elasticity of the inner layer of approximately 50 GPa. The carbon fibre filaments comprise an elastic modulus of approximately 324 GPa. In this layer, overall volume fraction closer to 60% can be achieved, in view of the 90° layers. Using a resin having an 8 GPa elastic modulus gives an overall elastic modulus of approximately 213 GPa for the outer layer 54. Consequently, the carbon fibre filaments have a modulus of elasticity approximately 3 to 4 times higher than the lower elastic modulus filaments. The ratio of carbon fibre stiffness to lower modulus fibre stiffness may be in the range of 2:1 to 5:1.

Figure 7:
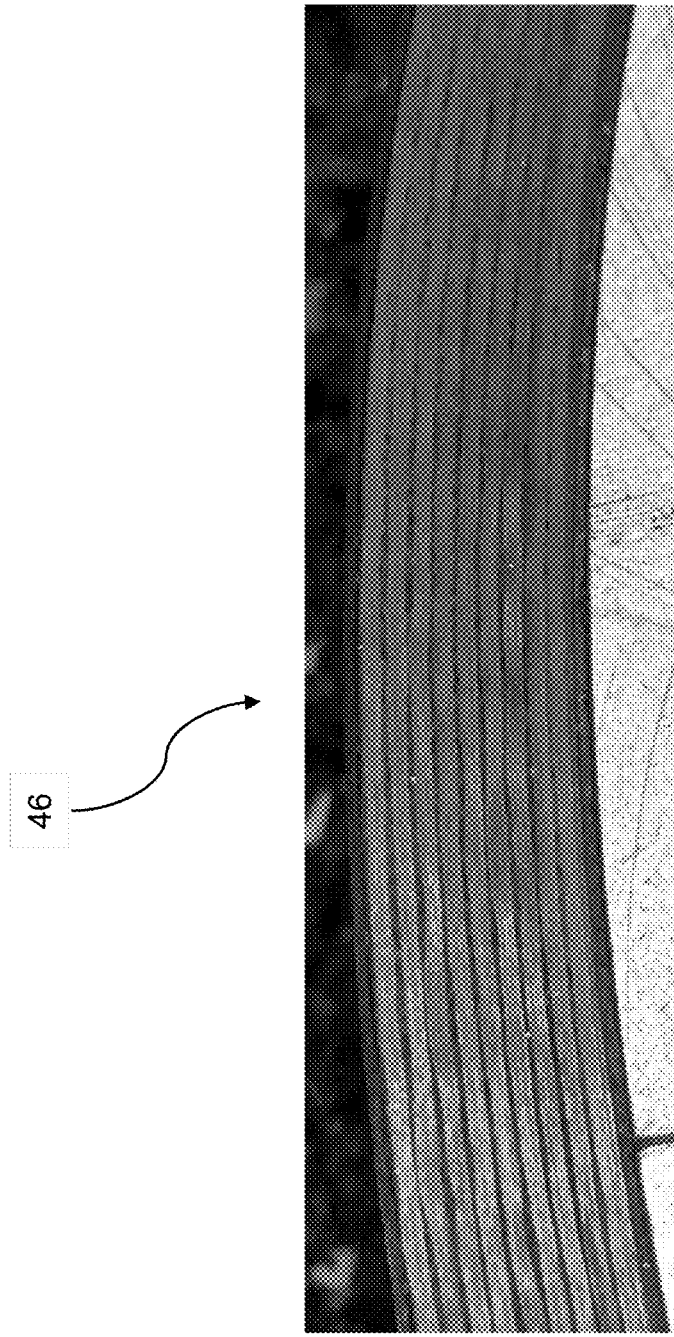
FIG. 7 is a photographic image of a cross section through a sleeve in accordance with the present disclosure.
Figure 8:
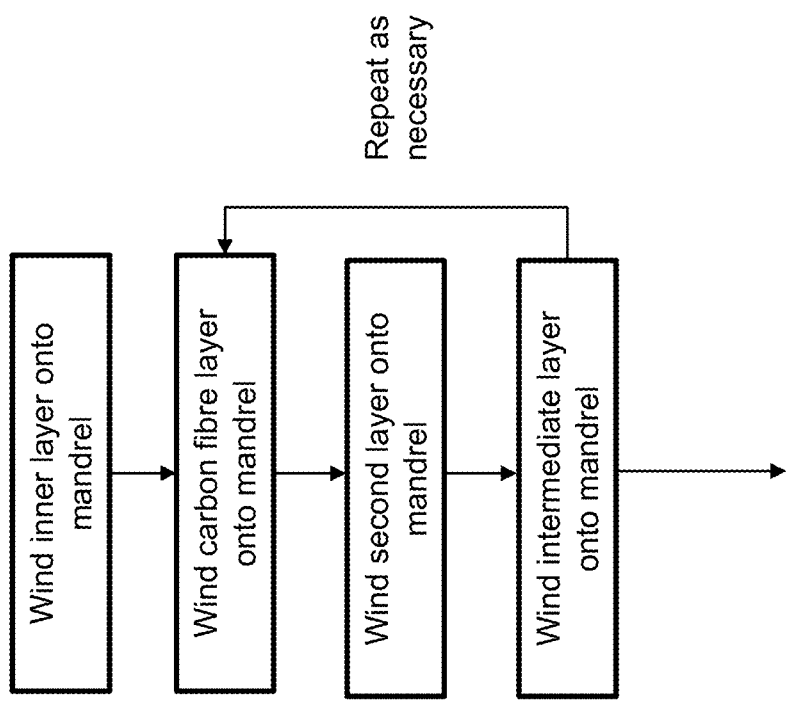
FIG. 8 is a flow diagram illustrating a method of manufacturing the sleeve of FIG. 4.

The resultant sleeve 46 is shown in cross-section in FIG. 7, which illustrates the various layers.

The filaments 56, 60 of both the inner and outer layers 52, 54 are subject to a pre-stress during layup and, which is held in place once the composite structure is cured, or the pre-stress may be applied after curing. Typically, the pre-stress is between 500 and 1500 Mega Pascals (MPa), and in one embodiment tested by the inventors, is approximately 1,100 MPA. Such a high pre-stress ensures a radial compressive load on the rotor magnets in order to secure their contact with the rotor in response to centrifugal forces in operational use, and is higher than can typically be achieved in the prior art. This contributes to a reduction in overall thickness of the sleeve 46 compared to prior art composite or metallic sleeves.

Several methods may be used for construction of the sleeve. One method is to apply the filaments 56, 60 directly to the permanent magnets 44, while applying tension to the filaments. The filaments could be pre-impregnated with matrix material (e.g. resin), or applied as sheets. Once applied, the composite material is then cured. In either case, the filaments 56 of the first layer 52 will be applied first until the required thickness is built up, followed by the second layer 54.

However, a problem with this process is that the matrix material typically requires a high temperature to cure. On the other hand, if the curing process must be undertaken at a temperature below the Curie temperature of the permanent magnets 44, otherwise magnetisation of the magnets will be lost. Consequently, the sleeve must be built up slowly and cured in multiple stages, resulting in a time consuming and slow process. This method also tends to lead to reduced pre-stress, since the pre-stress decreases during the curing step. The pre-stress using this installation method has been found to be limited to around 500-800 MPa in practice.

Figure 9B:
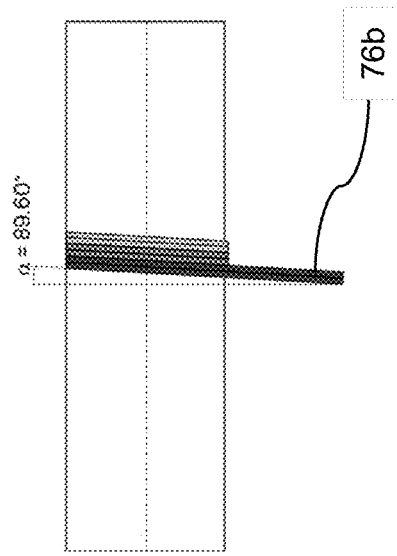
FIGS. 9a and 9b are diagram illustrating a method of controlling fibre angle.
Figure 9A:
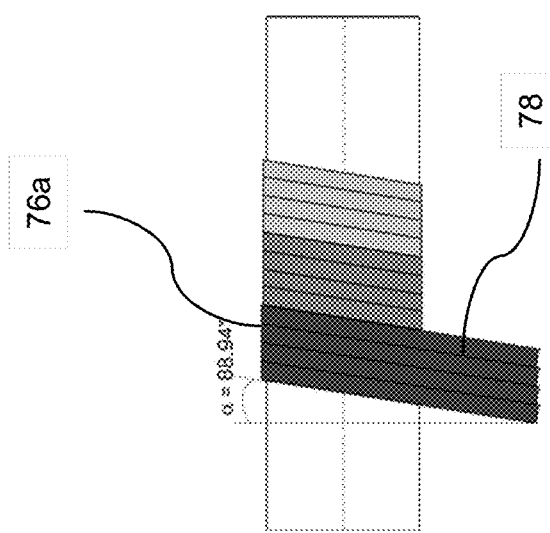

FIGS. 9a and 9b illustrate a method by which the angle of the carbon fibre filaments 68 can be varied. Carbon fibre tapes or "rovings" 76a, 76b are provided, having an axial width when wound around the sleeve. By varying the width of the carbon fibre tape, the angle is varied, with wider rovings resulting in angles closer to the axial direction for a given diameter sleeve. Commonly, rovings having a predetermined number of fibres in each roving are commercially available. In one example, a tape comprising four "24 k" rovings 78 (i.e. a roving comprising 24,000 fibres) is wound around a mandrel. This results in a fibre orientation of 88.94°, as shown in FIG. 9a.

FIG. 9b shows a second arrangement, in which a tape 76b comprising two 12 k rovings is used. This results in a sleeve having a fibre composite orientation angle of 89.6° from the axial direction. During testing, this sleeve was found to have a 30% improvement in tensile strength compared to the sleeve having an orientation of 88.94°. Consequently, a small difference in carbon fibre orientation can have a large impact on overall sleeve strength. During testing, it has been found that acceptable strength is provided when the fibre composite has an angle no less than 89.2°.

One option for installation of the sleeve onto the rotor, would be to wind the sleeve directly onto the rotor. However, a problem with this process is that the matrix material typically requires a high temperature to cure. On the other hand, using this method, the curing process must be undertaken at a temperature below the Curie temperature of the permanent magnets 44, otherwise magnetisation of the magnets will be lost. Consequently, the sleeve must be built up slowly and cured in multiple stages, resulting in a time consuming and slow process. This method also tends to lead to reduced pre-stress, since the pre-stress decreases during the curing step. The pre-stress using this installation method has been found to be limited to around 500-800 MPa in practice.

Figure 11:
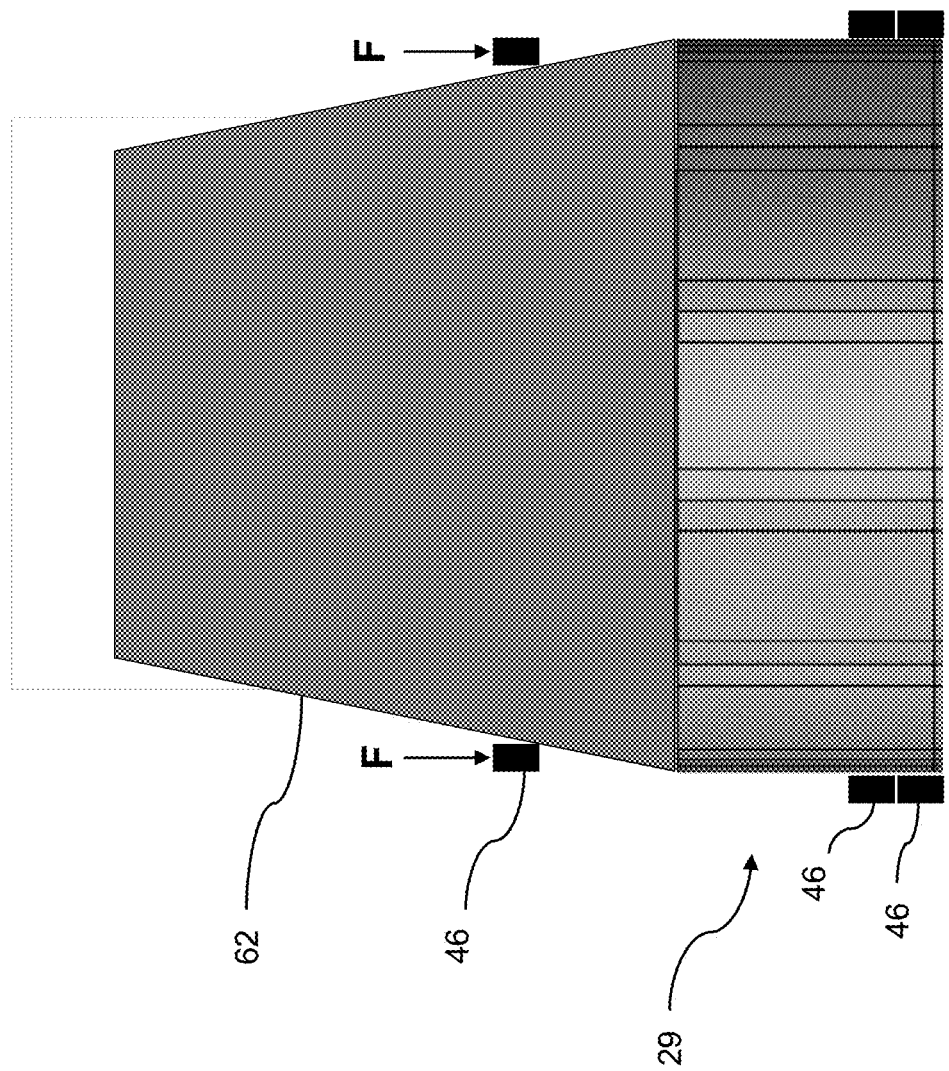
FIG. 11 is a cross-sectional side view of an assembly apparatus for carrying out the method of FIG. 10.

A second method is illustrating in FIG. 10, which utilises an apparatus shown in FIG. 11. In a first step, the filaments 56, 60 are wrapped around a separate mandrel (not shown), and cured. This may be conducted using pre-impregnated fibres that are directly placed on the mandrel or dry fibres that are drawn through a resin bath and then placed on a mandrel in what is known as a wet filament winding process.

In a second step, the structure is cured on the mandrel. Since the mandrel is not magnetised, the curing process can take place at a higher temperature.

In a third step, the sleeve is optionally cut into smaller rings, and forced over a conical assembly tool 62, shown in FIG. 11. The assembly tool 62 has an outside diameter which tapers outwardly from a smaller diameter to a larger diameter which matches or slightly exceeds the outer diameter of the permanent magnets 46 of the rotor 29. By forcing the sleeve 46 over the mandrel, a pre-tension is applied, which increases the radially inward force applied by the sleeve 46 to the permanent magnets 44 when installed.

In a fourth step, the sleeve 46 is forced onto the permanent magnets 44, until the sleeve 46 is fully installed in the desired position. At this point, the sleeve 46 is fully installed on the rotor 29, with an interference fit.

This installation method with high level of pre-stress has previously been tried by the inventors with conventional composite sleeves, but has been unsuccessful. In those cases, the composite sleeve was damaged by the installation process, leading to breakage of the fibres. By providing an inner layer 52 having a lower modulus of elasticity, the high modulus fibres are protected from mechanical damage during the press-fitting process, and so the sleeve can be more readily stretched over the assembly tool, without damaging the fibres of the second layer 54.

The disclosed sleeve and assembly method has been found by the inventors to provide a rotor sleeve having increased strength and reduced thickness relative to prior arrangements, in view of the increased pre-tension that can be applied. In one example, the radial thickness of the sleeve was reduced from 10.2 mm to 8.4 mm. It will be appreciated that, as well as resulting in a direct reduction in weight, the reduced thickness also reduces the effective size of the airgap between the rotor 29 and stator 50. This in turn increases the transmission of torque between the rotor and stator, and so increases power density. In one electric machine to which the sleeve has been applied by the inventors, this has resulted in an overall weight reduction of 77 kg for a 2.5 megawatt (MW) electric machine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The electric machine may be used for other applications. For example, the electric machine may be utilised as a starter/generator for a gas turbine engine. Alternatively, the electric machine may be used as either a generator or a motor in any other suitable application, such as an electric airliner that does not include a gas turbine engine.

The invention claimed is:

1. An electric machine comprising:
a stator;
a rotor radially inward of the stator and comprising a plurality of surface permanent magnets;
a rotor sleeve surrounding the rotor, the rotor sleeve comprising:
an inner layer having a radial thickness between 0.1 mm and 1 mm; and
an outer layer composed of a plurality of layers of fibre reinforced matrix material including:
a first layer of carbon fibre reinforced polymer comprising carbon fibres oriented substantially 90° to a rotational axis,
a second layer of fibres having a lower modulus of elasticity than that of the carbon fibres and being oriented between 50° and 75° in either one of a clockwise direction and an anti-clockwise direction relative to the rotational axis, and
a third layer of the fibres having the lower modulus of elasticity and being oriented between 50° and 75° in the other one of the clockwise direction and the anti-clockwise direction relative to the rotational axis,
the first layer, the second layer, and the third layer being stacked in this order,
the outer layer having a radial thickness between 3 mm and 15 mm, wherein:
a ratio of a radius of the rotor sleeve to a radial thickness of the rotor sleeve including the inner and outer layers is between 20 and 40; and
the electric machine has a maximum rotor rotational speed greater than 15000 RPM.

2. The rotor sleeve according to claim 1, wherein the plurality of layers comprises a plurality of layers of carbon fibre reinforced polymer, each layer of the carbon fibre reinforced polymer comprising fibres oriented substantially 90° to the rotational axis.

3. The rotor sleeve according to claim 1, wherein the rotor sleeve comprises at least another layer of carbon fibre reinforced polymer, and the second and third layers of fibres having the lower modulus of elasticity are provided between the first layer and the another layer of carbon fibre reinforced polymer.

4. The rotor sleeve according to claim 1, wherein the lower modulus of elasticity fibres in the second layer are oriented between 50° and 75° in the clockwise direction relative to the rotational axis, and the lower modulus of elasticity fibres in the third layer are oriented between 50° and 75° in the anti-clockwise direction relative to the rotational axis.

5. The rotor sleeve according to claim 2, wherein the carbon fibres of each carbon fibre reinforced polymer layer are oriented between 89° and 90° to the rotational axis.

6. The rotor sleeve according to claim 2, wherein one or more layer of carbon fibre reinforced polymer defines a radial thickness of no more than 2 mm.

7. The rotor sleeve according to claim 3, the sleeve comprises between 5 and 20% low modulus of elasticity fibre reinforced composite.

8. The rotor sleeve according to claim 1, wherein the lower modulus of elasticity fibres in the second and third layers comprise any of glass fibre, aramid, ultra-high molecular weight polyethylene (such as Dyneema™) and poly (p-phenylene-2,6-benzobisoxazole) (PBO).

9. The rotor sleeve according to claim 1, wherein the rotor sleeve comprises the inner layer of fibre reinforced matrix material provided radially inwardly of the outer layer of fibre reinforced matrix material, the inner layer comprising a first fibre material having a modulus of elasticity lower than the fibre material of the outer layer.

10. The rotor sleeve according to claim 9, wherein the inner and/or outer layer of fibre reinforced matrix materials comprise pre-stressed fibres, and the fibres of the outer layer are pre-stressed to a stress of greater than 1000 MPa.

11. The rotor sleeve according to claim 9, wherein the inner layer of fibre reinforced matrix materials comprise any of glass fibre, aramid, PBO, E-glass, S-glass, nylon, or Dyneema, or a mixture of one of more of these materials.

12. The rotor sleeve according to claim 9, wherein the outer layer comprises carbon fibre or ceramic fibre.

13. The rotor sleeve according to claim 9, wherein the outer layer comprises ply angles of approximately 90° relative to the rotational axis of an electric machine rotor when installed.

14. The rotor sleeve according to claim 5, wherein the carbon fibres of each carbon fibre reinforced polymer layer are oriented between 89.2° and 89.9° to the rotational axis.

15. The rotor sleeve according to claim 6, wherein the radial thickness of the one or more layer of carbon fibre reinforced polymer is between 1 and 2 mm.

16. The rotor sleeve according to claim 9, wherein the inner and/or outer layer of fibre reinforced matrix materials comprise pre-stressed fibres, and the fibres of the outer layer are pre-stressed to a stress of between 500 and 1500 MPA.

17. The rotor sleeve according to claim 1, wherein the radial thickness of the inner layer is approximately 0.5 mm.

* * * * *